(12) United States Patent
Prince et al.

(10) Patent No.: US 9,319,315 B2
(45) Date of Patent: Apr. 19, 2016

(54) DISTRIBUTING TRANSMISSION OF REQUESTS ACROSS MULTIPLE IP ADDRESSES OF A PROXY SERVER IN A CLOUD-BASED PROXY SERVICE

(71) Applicant: CloudFlare, Inc., San Francisco, CA (US)

(72) Inventors: Matthew Browning Prince, San Francisco, CA (US); Lee Hahn Holloway, Santa Cruz, CA (US); Matthieu Philippe François Tourne, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 44 days.

(21) Appl. No.: 13/858,635

(22) Filed: Apr. 8, 2013

(65) Prior Publication Data

US 2013/0227167 A1    Aug. 29, 2013

Related U.S. Application Data

(63) Continuation of application No. 13/246,737, filed on Sep. 27, 2011, now Pat. No. 8,438,240.

(51) Int. Cl.
*G06F 15/16* (2006.01)
*H04L 12/56* (2006.01)
*H04L 29/12* (2006.01)
*H04L 29/08* (2006.01)

(52) U.S. Cl.
CPC .......... *H04L 45/741* (2013.01); *H04L 61/1511* (2013.01); *H04L 61/25* (2013.01); *H04L 67/28* (2013.01); *H04L 67/2809* (2013.01); *H04L 67/1023* (2013.01)

(58) Field of Classification Search
CPC ... H04L 45/741; H04L 61/1511; H04L 61/25; H04L 67/28; H04L 67/2809; H04L 67/1023
USPC ......................................................... 709/217
See application file for complete search history.

(56) References Cited

U.S. PATENT DOCUMENTS 6,658,463 B1 * 12/2003 Dillon et al. ................... 709/219
7,136,387 B2 * 11/2006 Gallant et al. ............ 370/395.52

(Continued)

OTHER PUBLICATIONS

Non-Final Office Action, U.S. Appl. No. 13/246,737, dated Apr. 4, 2012, 19 pages.

(Continued)

*Primary Examiner* — Jerry Dennison
(74) *Attorney, Agent, or Firm* — Nicholson De Vos Webster & Elliott LLP

(57) ABSTRACT

A first packet is received at a proxy server from a client and includes a first incoming request for an action to be performed on an identified resource. The first packet is received at the proxy server as a result of a DNS request for a domain corresponding to the identified resource resolving to an IP address of the proxy server. The proxy server selects, based on at least in part on a set of parameters associated with the first packet, one of multiple IP addresses for use as a source IP address for a second packet that carries an outgoing request and transmits the second packet. The proxy server receives a third packet that includes an incoming response from the destination origin server in response to the outgoing request and transmits a fourth packet to the client that includes an outgoing response based on the incoming response.

26 Claims, 7 Drawing Sheets

(56) References Cited

U.S. PATENT DOCUMENTS

| | | | |
|---|---|---|---|
| 7,315,543 B2* | 1/2008 | Takeuchi et al. | 370/392 |
| 7,573,903 B2* | 8/2009 | Miyata et al. | 370/466 |
| 7,814,218 B1* | 10/2010 | Knee et al. | 709/230 |
| 7,860,098 B1* | 12/2010 | Biswas et al. | 370/392 |
| 7,924,832 B2* | 4/2011 | Li et al. | 370/389 |
| 2002/0038339 A1* | 3/2002 | Xu | 709/203 |
| 2003/0233454 A1* | 12/2003 | Alkhatib et al. | 709/226 |
| 2004/0098512 A1* | 5/2004 | Lin | 709/249 |
| 2004/0190549 A1* | 9/2004 | Huitema | 370/466 |
| 2004/0233916 A1* | 11/2004 | Takeuchi et al. | 370/395.54 |
| 2006/0067342 A1* | 3/2006 | Dispensa | 370/401 |
| 2007/0002857 A1* | 1/2007 | Maher | 370/389 |
| 2008/0034092 A1* | 2/2008 | Kikuchi et al. | 709/225 |
| 2009/0003197 A1* | 1/2009 | Jones | 370/221 |
| 2009/0022152 A1* | 1/2009 | Henry et al. | 370/389 |
| 2009/0044280 A1* | 2/2009 | Wu et al. | 726/26 |
| 2009/0059940 A1* | 3/2009 | Sultan | 370/401 |
| 2009/0248800 A1* | 10/2009 | Chu et al. | 709/204 |
| 2009/0292796 A1* | 11/2009 | Huang | 709/222 |
| 2009/0307485 A1* | 12/2009 | Weniger et al. | 713/153 |
| 2010/0118869 A1* | 5/2010 | Li et al. | 370/389 |
| 2010/0235632 A1* | 9/2010 | Iyengar et al. | 713/166 |
| 2011/0035470 A1* | 2/2011 | Deutsch et al. | 709/220 |
| 2011/0153937 A1* | 6/2011 | Annamalaisami et al. | 711/118 |
| 2011/0154026 A1* | 6/2011 | Edstrom et al. | 713/158 |
| 2011/0154488 A1* | 6/2011 | Rajan et al. | 726/22 |
| 2011/0182291 A1* | 7/2011 | Li et al. | 370/389 |
| 2011/0235595 A1* | 9/2011 | Mehta et al. | 370/329 |
| 2011/0277026 A1* | 11/2011 | Agarwal et al. | 726/8 |
| 2011/0277027 A1* | 11/2011 | Hayton et al. | 726/8 |
| 2012/0082158 A1 | 4/2012 | Reddy et al. | |

OTHER PUBLICATIONS

Final Office Action, U.S. Appl. No. 13/246,737, dated Sep. 12, 2012, 18 pages.

Notice of Allowance, U.S. Appl. No. 13/246,737, dated Jan. 8, 2013, 6 pages.

* cited by examiner

DISTRIBUTING TRANSMISSION OF REQUESTS ACROSS MULTIPLE IP ADDRESSES OF A PROXY SERVER IN A CLOUD-BASED PROXY SERVICE

CROSS-REFERENCE TO RELATED APPLICATIONS

This application is a continuation of application Ser. No. 13/246,737, filed Sep. 27, 2011, now U.S. Pat. No. 8,438,240 issued on May 7, 2013, which is hereby incorporated by reference.

FIELD

Embodiments of the invention relate to the field of network communication; and more specifically, to distributing the transmission of requests across multiple IP addresses of a proxy server in a cloud-based proxy service.

BACKGROUND

The Internet includes a system of networks connected together. At least some of the networks may be incompatible with other networks. For example, some networks may operate using IPv6 (described in RFC 1883 (1995)) and other networks may operate using IPv4 (described in RFC 791 (1981)). IPv6 is designed to succeed IPv4, which is the dominant protocol version currently in use by clients. Since the number of addresses in the IPv4 address space is limited and is reaching exhaustion, a gradual move to IPv6 is occurring as one of the main advantages of IPv6 is that it supports many more addresses than IPv4. IPv6, however, does not directly interoperate with IPv4. For example, clients that support only IPv4 cannot directly communicate with IPv6-only servers, and IPv6-only clients cannot directly communicate with IPv4-only servers. In the Domain Name System (DNS), the "A" resource records map hostnames (domain names) to IPv4 addresses and the "AAAA" (quad A) resource records map hostnames to IPv6 addresses.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

Figure 1:
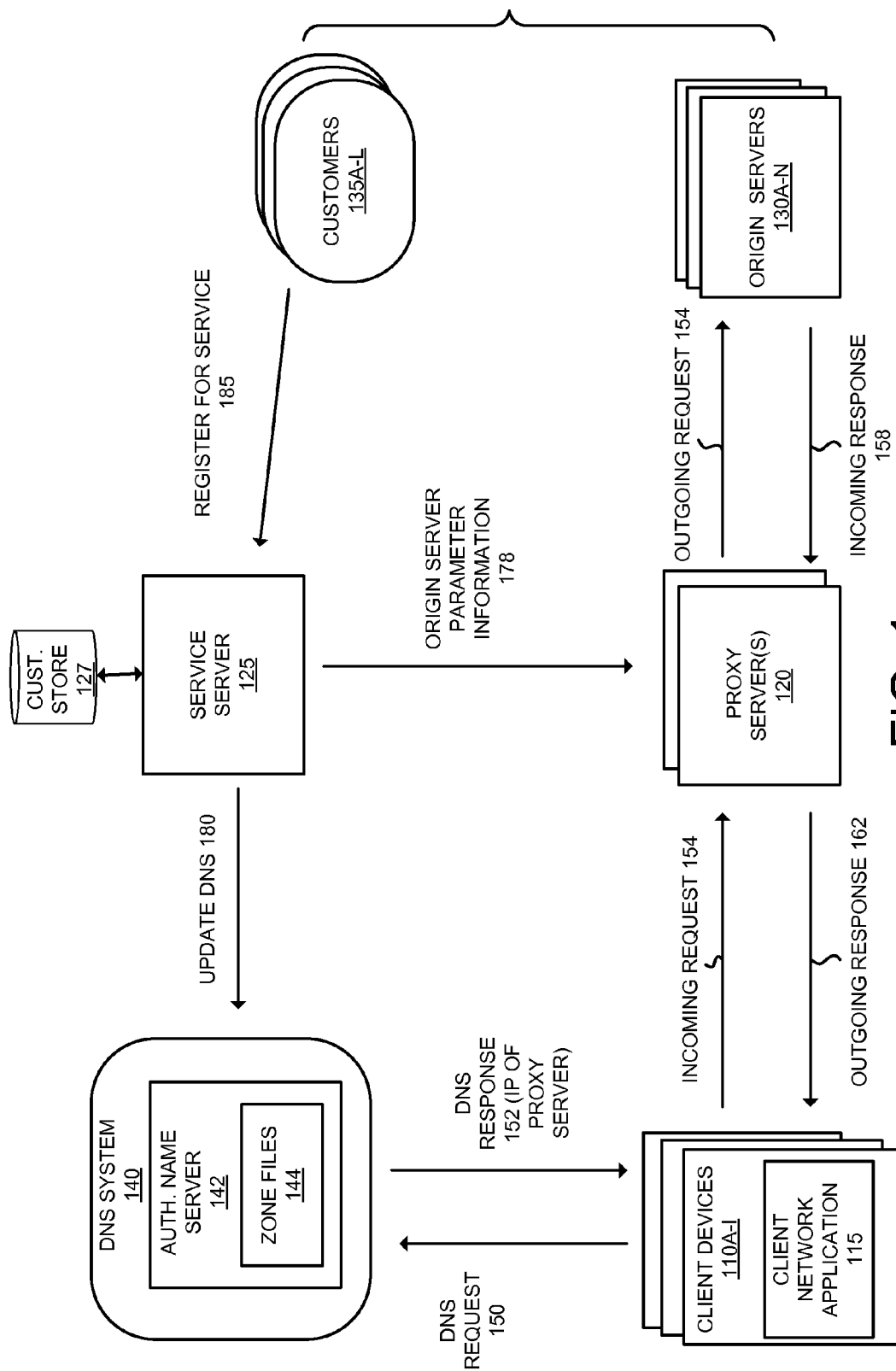
FIG. 1 illustrates an exemplary system for a cloud-based proxy service provisioned through DNS according to one embodiment.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. In the following description and claims, the terms "coupled" along with its derivatives, may be used. "Coupled" is used to indicate that two or more elements, which may or may not be in direct physical or electrical contact with each other, co-operate or interact with each other.

A cloud-based proxy service provisioned through DNS is described. The cloud-based proxy service is available as a service over the Internet and does not require customers (e.g., owners of a domain and/or personnel working on behalf of a domain owner) to install additional hardware or software in order to support the service. In some embodiments, customers provision the cloud-based proxy service through DNS. For example, DNS record(s) of a customer are changed such that DNS records of hostnames (e.g., mapped to IPv4 and/or IPv6 addresses) point to one or more proxy servers of the service instead of the server(s) on which the content is originated (the "origin server"). In some embodiments, the authoritative name server of the customer's domain is changed to an authoritative name server of the service and/or individual DNS records are changed to point to the proxy server (or point to other domain(s) that point to a proxy server of the service). For example, the customers may change their DNS using a CNAME record that points to a proxy server of the service.

The cloud-based proxy service may provide services including protection against Internet-based threats (e.g., proactively stopping botnets, cleaning viruses, trojans, and worms, etc.), performance services for customers (e.g., acting as a node in a content delivery network (CDN) and dynamically caching customer's files closer to visitors, page acceleration, etc.), and/or other services. In one embodiment and as described in greater detail later herein, the cloud-based proxy service includes an incompatible network gateway service that transitions incoming requests and responses using a first protocol type to outgoing requests and responses using a different second protocol type.

The cloud-based proxy service includes a proxy network that includes one or more proxy servers. A client device transmits an IP packet including a request for an action to be performed on an identified resource (e.g., an HTTP GET request, an HTTP POST request, other HTTP request method, or other request to be applied to an identified resource on an origin server) to an IP address of the proxy server. In one embodiment, the packet with the request is received at the proxy server as a result of a DNS query for a domain resolving to the proxy server. The request for the action to be performed on an identified resource (e.g., HTTP request) may either be carried by IPv4 or IPv6, typically depending on the type of DNS record requested from the DNS system. For example, if the client device requests from the DNS system an A record and receives an IPv4 address from the DNS system, the client device transmits an IPv4 packet carrying an HTTP request to the IPv4 address.

The proxy server receives the request over IPv4 or IPv6 depending on the protocol version of the packet carrying request. In one embodiment, the connection between the client device and the proxy server remains open at least until the proxy server transmits a response to client device or the connection is terminated due to timeouts, connection resets or other abnormal termination events. In another embodiment, the connection between the client device and the proxy server is not kept open.

The proxy server may perform one or more actions on an incoming request received from a client device. For example, the proxy server may perform one or more of the following responsive to receiving a request: determine whether the visitor making the request is allowed access to the requested content; determine whether the visitor poses an Internet security threat (e.g., is a bot, is infected with a virus or other vulnerability, etc.); determine whether the request itself poses an Internet security threat (e.g., an SQL injection attack, etc.); determine whether the request is malformed; determine the type and/or size of the requested content; determine whether the origin server is offline; and determine whether the requested content is available in cache.

If the proxy server determines to transmit the request (or a similar request) to the origin server, the proxy server changes the source IP address to be an IP address of the proxy server. The source IP address for the outgoing request is referred herein as the "outgoing source IP address." Further detail regarding selecting an IP address for the outgoing source IP address will be described later herein. In addition, the proxy server directs the request to an IP address of the origin server. As will be described in greater detail later herein, in some instances the incoming request (the request received at the proxy server from a client device) and the outgoing request (the request transmitted from the proxy server to the origin server) use different protocol types. In some embodiments, the requested content may be available on one or more origin servers at one or more IP addresses. In such embodiments, the proxy server selects an IP address of the origin server for the destination IP address of the request (referred herein as the "outgoing destination IP address"). Further detail regarding selecting an IP address for the outgoing destination IP address will be described later herein.

The responses (e.g., HTTP responses, HTTPS responses) may also be routed to the proxy server prior to transmission to the requesting client device. The proxy server may perform one or more actions on an incoming response received from an origin server. For example, the proxy server may perform one or more of the following: determine whether the response poses an Internet security threat (e.g., whether the content includes a virus, worm, or other vulnerability) and block the response; determine whether the response includes one or more elements that are to be excluded from being delivered to the visitor and excluding those element(s); determine whether to modify element(s) of the response and modifying those element(s); determine whether to obfuscate element(s) of the response (e.g., obfuscating an email address such that it will be displayed on the rendered page but obfuscated from the page source) and obfuscating those element(s); determine whether to add content to the response and add that content to the response; and determine whether to cache the contents.

If the proxy server determines to transmit the response (or a response as modified) to the requesting client device, the proxy server changes the source IP address to the IP address in which the original request was directed to and directs the response to the requesting client device. As will be described in greater detail later herein, in some instances the incoming response (the response received at the proxy server from an origin server) and the outgoing response (the response transmitted from the proxy server to the requesting client device) use different protocol types.

FIG. 1 illustrates an exemplary system for a cloud-based proxy service provisioned through DNS according to one embodiment. The customers 135A-L own or control domains that are hosted on the origin servers 130A-N. The customers 135A-L may or may not own or control the origin servers 130A-N. For example, a domain owner 135 may contract with a hosting provider that owns an origin server 130 that hosts at least some of the content of the domain of the domain owner 135. The domains owned and/or controlled by the customers 135A-L point to the proxy server(s) 120. That is, a DNS query for any of those domains resolve to the proxy server(s) 120.

The DNS system 140 is used to refer to the DNS system as a whole and includes multiple DNS servers to resolve DNS requests. As illustrated, the DNS system 140 includes the authoritative name server 142, which is an authoritative name server for the service. The authoritative name server 142 may be the authoritative name server for the domains hosted at the origin servers 130A-N. It should be understood that the DNS system 140 may include more DNS servers (e.g., preferred domain servers, top-level domain name servers, or other domain servers) than illustrated. It should also be understood that there may be multiple authoritative web servers for the service and they may be geographically distributed. In one embodiment, the authoritative name servers for each the domains have been changed to the authoritative name server 142, which is associated with the service. It should be understood that the backup authoritative name servers serving the domains may also be changed. In one embodiment, the zone file records for the domains of the customers 135A-L are changed such that DNS resolution requests for those domains resolve to the proxy server(s) 120.

The service server 125, operated by the service, provides a set of tools and interfaces for the customers 135A-L and is accessible over the Internet. For example, the service server 125, among other things, allows the customers 135A-L to register for the cloud-based proxy service 185. The cloud-based proxy service is provisioned through DNS. Thus, DNS record(s) of a customer 135 are changed such that the domain(s) of that customer 135 map to one or more IP addresses of one or more proxy server(s) 120. In one embodiment, the customers 135A-L use the service server 125 to change their domain(s) to map to an IP address of one or more proxy server(s) 120 or indicate which domain(s) should be proxied and the service server 125 automatically causes the domain(s) to be to map to one or more IP addresses of one or more proxy server(s) 120. The service server 125 may update the DNS record(s) 180 accordingly.

In embodiments where the cloud-based proxy service includes an incompatible network gateway service, a customer 135 may use the service server 125 to indicate whether the origin server 130 that is hosting its domain is an IPv4 server or an IPv6 server (or can handle both IPv4 and IPv6). In addition to or in lieu of the customer input, the service server 125 can also derive whether the origin server 130 that is hosting the domain of a customer supports IPv4 and/or IPv6 by examining the DNS record types. For example, if an A record exists for the domain, then it is likely that the origin server supports IPv4 and similarly an AAAA record indicates that it is likely that the origin server supports IPv6. The service server 125 may also periodically check whether a particular origin supports IPv4 and/or IPv6 by attempting to connect to the origin server using IPv4 and/or IPv6 respectively. The customer may also indicate a preference of IP version type if both IPv4 and IPv6 are supported. The service server 125 stores the information regarding the IP version(s) the origin supports as well as the IP version preference information in the customer store 127. The service server 125 may also distribute the origin server parameter information 178 to one or more proxy server(s) 120. The origin server parameter information 178 may include, for each domain of an origin server, the IP address(es) for that domain.

In one embodiment, the service server 125 causes an A record and/or an AAAA record to be added for one or more of the hostnames of the customer (if not already existing) that point to a proxy server 120. For example, if the customer that owns/controls the domain example.com has an A record for example.com but not an AAAA record for example.com, the service server 125 may automatically cause an AAAA record to be created (or prompt the customer to create an AAAA record for example.com) that is mapped to an IPv6 address of one or more proxy servers 120. In one embodiment, the service server 125 may cause an A record to be added for one or more hostnames of the customer even if the origin server does not support IPv4 and/or the service server 125 may cause an AAAA record to be added for one or more hostnames of the customer even if the origin server does not support IPv6.

The origin servers 130A-N are computing devices that serve network resources (e.g., HTML pages, images, word processing documents, PDF files, movie files, music files, or other computer files). The origin servers 130A-N respond to requests for network resources (e.g., from an HTTP request, FTP request, telnet request, etc.). Some of the origin servers 130A-N may only support IPv4, some may only support IPv6, and some may support IPv4 and IPv6. Although not illustrated in FIG. 1, it should be understood that the network resources of the origin servers 130A-N may be stored separately from the device that responds to the requests. In addition, some of the origin servers 130A-N may host multiple ones of the domains owned by the domain owners 135A-L. For example, a single origin server 130 may host multiple domains owned by the same domain owner or different domain owners through use of virtual hosting.

The client devices 110A-I are computing devices that are capable of accessing network resources (e.g., laptops, workstations, smartphones, palm tops, mobile phones, tablets, gaming systems, set-top boxes, etc.). Each of the client devices 110A-I include a client network application 115 (e.g., web browser, FTP client, SSH client, Telnet client, etc.) that is capable of accessing network resources. Users at the client devices 110A-I request network resources (e.g., HTML pages, images, word processing documents, PDF files, movie files, music files, or other computer files) through the client network application 115. Some of the client devices 110A-I may be limited to accessing Internet resources only using IPv4, some may be limited to accessing Internet resources only using IPv6, while others may be able to access Internet resources using IPv4 and IPv6.

Each of the proxy server(s) 120 is a computing device that is situated between the client devices 110A-I and the origin servers 130A-N. Certain network traffic between the client devices 110A-I that is destined for the origin servers 130A-N passes through one of the proxy server(s) 120. For example, packets including a request for an action to be performed on an identified resource (e.g., an HTTP GET request, an HTTP POST request, other HTTP request method, or other request to be applied to an identified resource on an origin server) are routed to one of the proxy server(s) 120 as a result of a DNS request 150 for those domains resolving 152 to the proxy server 120. For example, the incoming request 154 is received at one of the proxy server(s) 120 as a result of DNS resolution for a domain hosted at an origin server 130 resolving to the proxy server 120. The incoming request 154 may be received over an IPv4 connection or an IPv6 connection.

As described above, the proxy server 120 may perform one or more request related actions on the request. If the proxy server 120 determines to transmit the request (or a modified version of the request) to the origin server 130 that hosts the requested content, the proxy server changes the source IP address to be an IP address of the proxy server and transmits the outgoing request 154 to the appropriate origins server 130. The outgoing request may be transmitted over an IPv4 connection or an IPv6 connection.

Responses (e.g., HTTP responses, HTTPS responses) may also be routed to the proxy server 120 prior to transmission to the client devices 110A-I. For example, the incoming response 158 is received at a proxy server 120 from an origin server 130. The incoming response 158 may be transmitted over an IPv4 connection or an IPv6 connection. As described above, the proxy server 120 may perform one or more response related actions responsive to receiving an incoming response. If the proxy server determines to transmit the response (or a modified version of the response) to the requesting client device, the proxy server changes the source IP address to the IP address in which the original request was directed and transmits the outgoing response 162 to the requesting client device.

In embodiments where the cloud-based proxy service includes an incompatible network gateway service, the proxy server 120 transitions between the incompatible networks for the requests and responses. For convenience of explanation, the examples of an incompatible network gateway service provided herein refer to an IPv4 to IPv6 incompatible network gateway service. However, it should be realized that the incompatible network gateway service can act as a gateway between other types of incompatible networks and/or protocols. For example, while the following examples describe the transmission and receipt of IP packets (either IPv4 packets or IPv6 packets), the proxy server 120 may act as a gateway between other protocol types and incompatible networks (e.g., a first port to a second port (e.g., port 80 to port 8080), between TCP and another network protocol, between HTTP and FTP, between HTTP and SPDY, etc.). Thus, by way of a specific example, in embodiments where the cloud-based proxy service includes an IPv4 to IPv6 incompatible network gateway service, the proxy server 120 transitions between IP versions for those requests (e.g., HTTP requests, HTTPS requests) that are received using a particular IP version and are to be transmitted to the origin server using a different IP version. The proxy server(s) 120 may transmit requests received on an IPv4 connection to the origin server using an IPv6 connection, and may transmit requests received on an IPv6 connection to the origin server using an IPv4 connection. For example, responsive to the proxy server 120 receiving a request (e.g., an HTTP request, HTTPs request) from a client device 110 on an IPv4 connection and determining that the request should be transmitted to a destination origin server 130 using an IPv6 connection, the proxy server 120 transmits that request using the IPv6 connection. As another example, responsive to the proxy server 120 receiving a request (e.g., an HTTP request, HTTPs request) from a client device 110 on an IPv6 connection and determining that the request should be transmitted to a destination origin server 130 using an IPv4 connection, the proxy server 120 transmits that request using the IPv4 connection.

Figure 2:
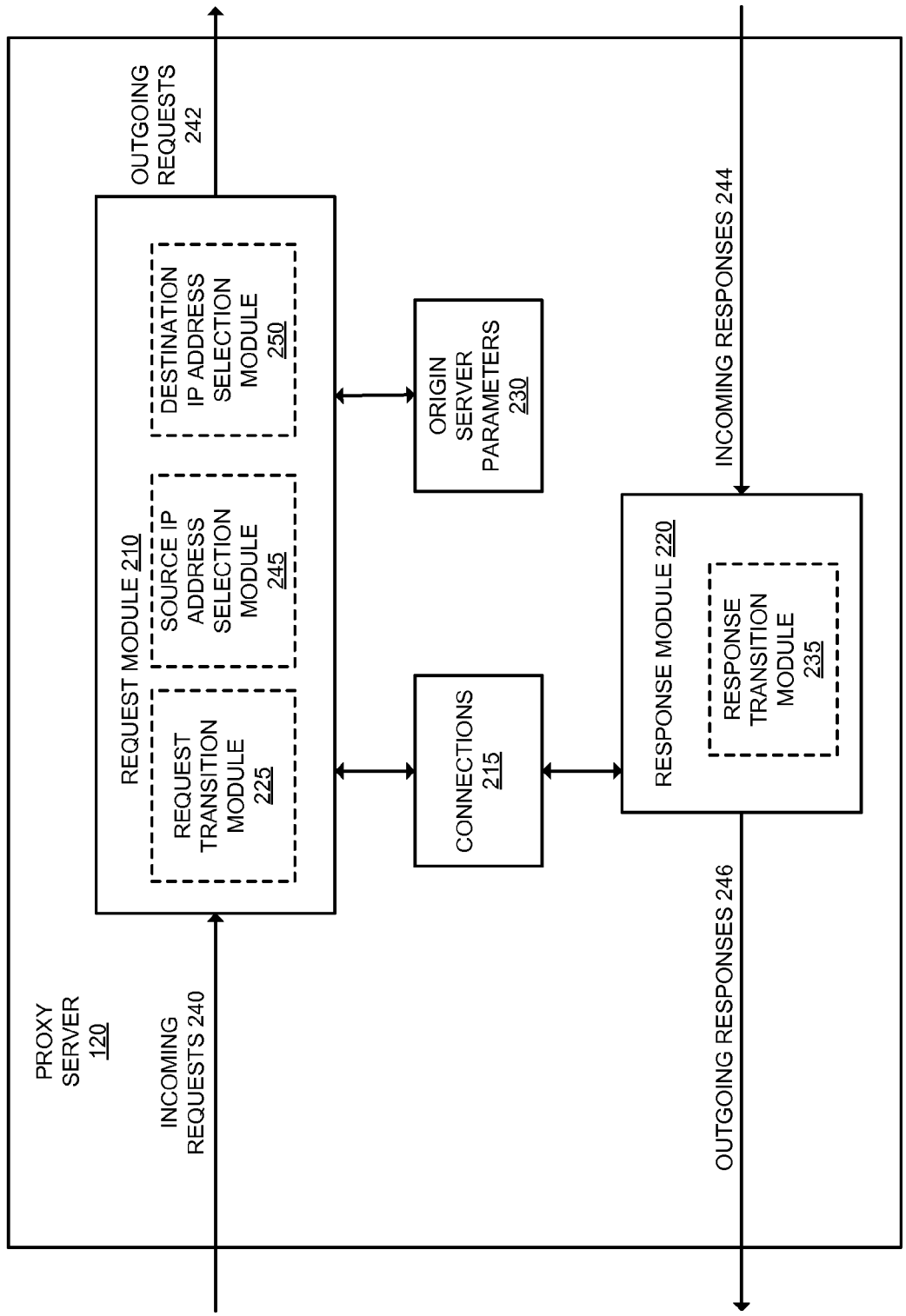
FIG. 2 is a block diagram that illustrates an exemplary architecture of a proxy server of FIG. 1 according to one embodiment.

FIG. 2 is a block diagram that illustrates an exemplary architecture of a proxy server 120 according to one embodiment. As illustrated in FIG. 2, the proxy server 120 includes a request module 210 coupled with a connections data structure 215 and an origin server parameter data structure 230, and a response module 220 coupled with the connections data structure 215.

The request module 210 receives and processes the incoming requests 240 (e.g., received from the client devices 110A-I) and transmits outgoing requests 242 (e.g., to the origin servers 130A-N). In some embodiments, the request module includes the request transition module 225, which transitions between incoming requests and outgoing requests of different incompatible networks (e.g., IPv4 and IPv6). In some embodiments, the request module 210 includes separate components for processing incoming IPv4 and IPv6 requests and transmitting outgoing IPv4 and IPv6 requests.

The proxy server 120 may include multiple IP addresses that can be used for the outgoing source IP addresses. In some cases, the IP address pool available on the proxy server 120 is less than the number of different IP addresses included in requests that are received on the proxy server 120. For example, the proxy server 120 may receive N requests with M source IP addresses and have L IP addresses that can be used as the outgoing source IP addresses, where M is greater than L. Thus, multiple requests from different originating IP addresses may share the same outgoing source IP address.

An origin server 130 may include logic that will block or throttle certain IP addresses if a predefined number of requests are received over a predefined amount of time. As described herein, this logic is referred to as "performance logic." Performance logic may be included, for example, in a denial-of-service (DoS) intrusion prevention system on the origin server 130 and/or on a separate intrusion prevention system device connected with the origin server 130.

As a result, in some embodiments, the proxy server selectively distributes the outgoing requests across its multiple IP addresses in an effort to reduce the possibility of triggering the performance logic. In such embodiments, the request module 210 includes the source IP address selection module 245 to select an IP address of the proxy server 120 for use as the source IP address for the outgoing requests 242.

The selection of IP addresses for use as outgoing source IP addresses may be performed differently in different embodiments. In one embodiment, the IP address selection takes as input a set of one or more parameters relating to the incoming request. For example, the set of parameters may include one or more of the following: the source IP address of the incoming request, the requested domain (e.g., as indicated in the Host header of an HTTP request) of the incoming request, the source port of the incoming request, cookie(s) of the incoming request, or any combination of the same. The result of the IP address selection is an IP address from the IP address pool of the proxy server. Thus in this embodiment, the IP address selected from the IP address pool of the proxy server is dependent at least in part on at least one parameter associated with the incoming request. In another embodiment, the IP address selection function selects an IP address to use for outgoing requests from the IP address pool in a predefined order (e.g., round-robin, etc.). In another embodiment, the IP address selection function selects an IP address for outgoing requests from the IP address pool randomly.

In some circumstances, after an outgoing source IP address is selected, that IP address is consistently mapped such that incoming requests with similar parameter(s) (e.g., the same source IP address, same source port, same requested domain, or any combination of the same) will use the same outgoing source IP address. Some websites may require session persistence for proper functionality. In a particular session, multiple related requests may be transmitted from the same client directed to the origin server. The origin server may store session data necessary for the proper interaction between the client device and the origin server. As an example, a website that requires login information (e.g., email, financial institution, etc.) often requires session persistence. If the selected outgoing source IP address was not consistently mapped to the same outgoing source IP address (at least during a lifetime of the session), then the origin server may believe that a different session is attempting to be established or otherwise errors to be displayed.

In one embodiment, whether a selected outgoing source IP address is consistently mapped is determined based on whether the requested content is of a type where session persistence is likely to be required. In one embodiment, whether a selected outgoing source IP address is consistently mapped is based on the type of the content of the request. For example, if the requested content is dynamic (e.g., an HTML document, or other dynamic content), then it may be assumed that the persistence may be required and thus the selected outgoing source IP address is consistently mapped. If the requested content is static (e.g., an image file, a video file, etc.), then it may be assumed that persistence is not required and thus the selected outgoing source IP address may not be consistently mapped.

An origin server 130 may include multiple IP addresses for the same requested domain, which may be stored in the origin server parameters 230. In some embodiments, the request module 210 includes the destination IP address selection module 250 to select an IP address of the requested domain for use as the destination IP address of the outgoing requests.

The selection of the outgoing destination IP address can be different in different embodiments. For example, in one embodiment, the selection of the outgoing destination IP address is based on the preferences provided by the customer. For example, during provisioning of the service (or sometime after the service has been configured), a customer 135 may specify a set of one or destination address rules. The destination address rules may indicate one or more of: which one of the multiple IP addresses to send the request to, a destination selection algorithm (e.g., round-robin, IP address least recently used, the IP address whose corresponding connection has the lowest latency, the IP address that is the least used), and a particular IP protocol preference. In one embodiment, the destination address rules are stored in the origin server parameters 230. In one embodiment, the proxy server 120 (or other computing device such as the service server 125) periodically tests the destination IP addresses (e.g., by transmitting a request to those destination IP addresses) to determine the status of each destination IP address (e.g., up or down), the latency associated with each destination IP address, etc.

In one embodiment, if the outgoing source IP address is mapped consistently, then the outgoing destination IP address is also mapped consistently. Thus, the outgoing destination IP address is consistently mapped such that incoming requests with similar parameter(s) (e.g., the same source IP address, same source port, same requested domain, same cookie(s), or any combination thereof) will use the same outgoing destination IP address.

Figure 3:
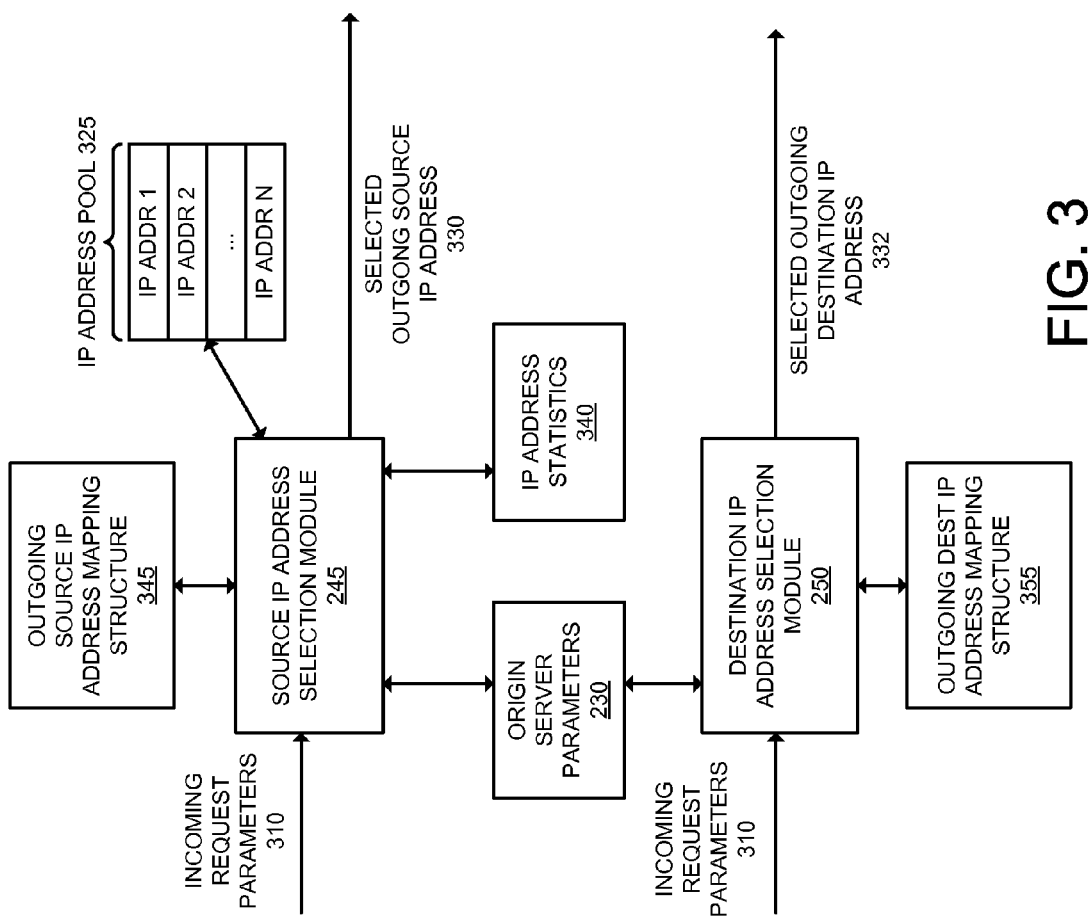
FIG. 3 is a block diagram that illustrates an exemplary source IP load balancing module according to one embodiment.

FIG. 3 is a block diagram that illustrates an exemplary source IP load balancing module according to one embodiment. The IP load balancing module 245 includes the IP address selection module 320 that is used to select an IP address from the IP address pool 325 for use as the outgoing source IP address for outgoing requests. While FIG. 3 illustrates a single IP address pool 325, in some embodiments there are multiple IP address pools (e.g., an IP address pool for IPv4 addresses and an IP address pool for IPv6 addresses).

Figure 4:
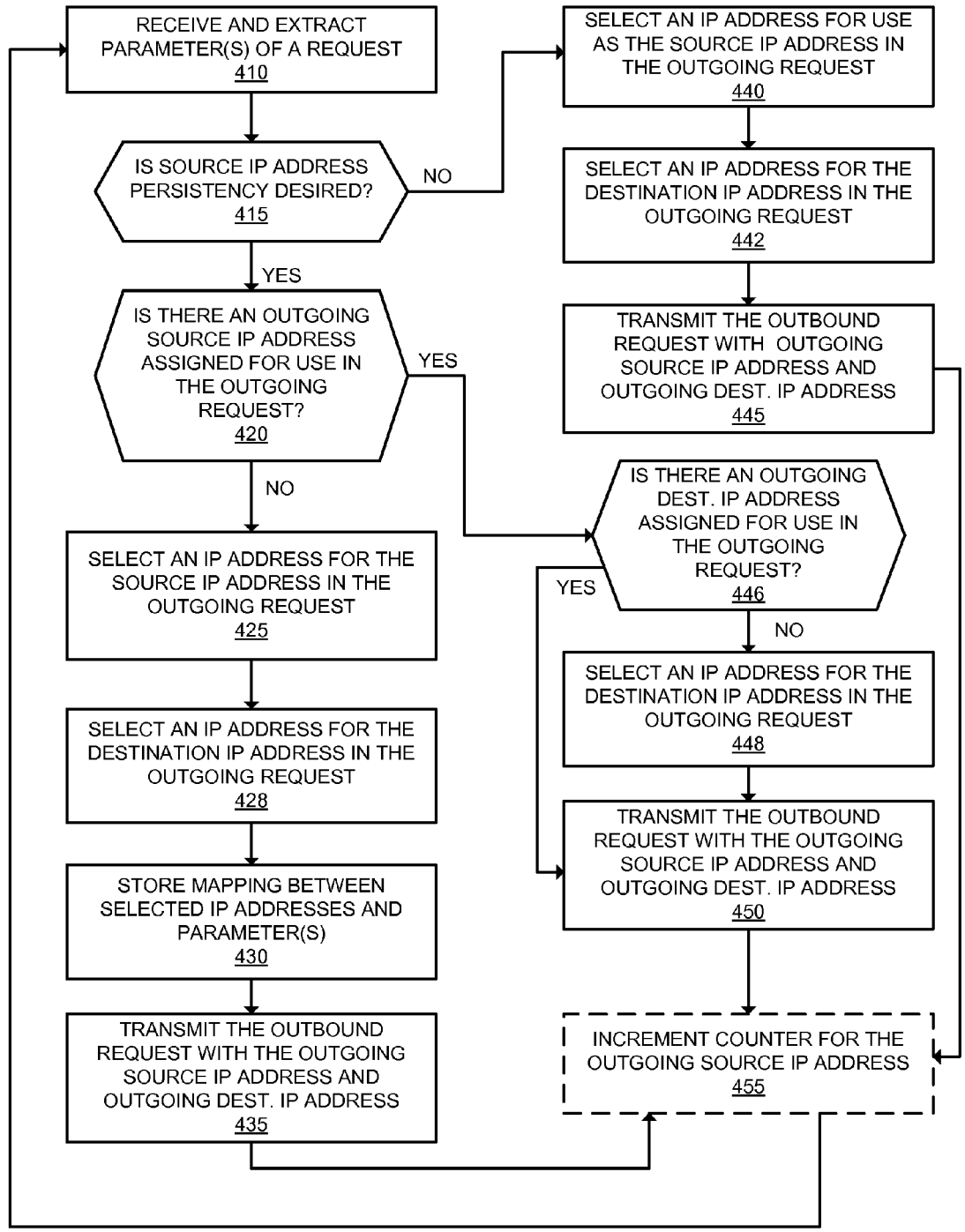
FIG. 4 is a flow diagram that illustrates exemplary operations performed by a proxy server when selecting an IP address to use as an outgoing source IP address for outgoing requests according to one embodiment.

FIG. 4 is a flow diagram that illustrates exemplary operations performed by a proxy server when selecting an IP address to use as an outgoing source IP address for outgoing requests according to one embodiment. The operations of FIG. 4 are described with reference to the exemplary embodiments of FIG. 3. However, it should be understood that the operations of FIG. 4 can be performed by embodiments other than those discussed with reference to FIG. 3, and the embodiments discussed with reference to FIG. 3 can perform operations other than those discussed with reference to FIG. 4. The operations of FIG. 4 may be performed in relation with the incompatible network gateway service described herein and/or in relation to other cloud-based proxy services that may not include the incompatible network gateway service.

At operation 410, a proxy server receives an incoming request from a client device and extracts a set of one or more parameters related to the request. For example, the set of parameters may include one or more of the following: the source IP address of the incoming request, the requested domain (e.g., as indicated in the Host header of an HTTP request) of the incoming request, the source port of the incoming request, cookie(s) of the incoming request, session identifier(s) of the incoming request (if different than the cookie(s)), the type of requested content (e.g., HTML, image, video, etc.), or any combination thereof. With respect to FIG. 3, the incoming request parameters are received at the source IP address selection module 245. Flow moves from operation 410 to operation 415.

At operation 415, a determination is made whether source IP address persistency is desired (whether the source IP address should be consistently mapped). This determination may be based on one or more of the set of parameters. For example, in one embodiment, the source IP address selection module 245 determines whether source IP address persistency is desired based on the type of requested content. By way of example, if the type of requested content is dynamic (e.g., an HTML document or other dynamic content), then source IP address persistency is desired; if the type of requested content is static (e.g., an image file, a video file, etc.), then source IP address persistency may not be desired. If source IP address persistency is desired, then flow moves to operation 420, otherwise flow moves to operation 440.

At operation 420, a determination is made whether there is an outgoing source IP address assigned for use in the outgoing request. For example, the source IP address selection module 245 accesses the outgoing source IP address mapping structure 345 to determine whether there is an outgoing source IP address that is mapped to one or more of the parameter(s) extracted from the request. For example, the outgoing source IP address mapping structure 345 may store a mapping between an IP address of the IP address pool 325 and parameter(s) of the request including the requested domain (e.g., as indicated in the Host header of an HTTP request, the source IP address of the incoming request, and/or a session identifier of the request). An attribute may also be associated with the parameter(s) that indicates that the IP address is to be used for session persistency.

In an implementation where the proxy server transitions between IPv4 and IPv6, the outgoing source IP address mapping structure 345 may include an IPv4 address and/or an IPv6 address. In one embodiment, in implementations where the cloud-based proxy service includes an incompatible network gateway service (e.g., IPv4 to IPv6), the request module 210 determines the protocol used to transmit the outgoing request (e.g., IPv4 or IPv6) prior to determining whether there is an outgoing source IP address assigned for use in the outgoing request. For example, if the protocol used to transmit the outgoing request is IPv4, then the request module 210 determines whether an IPv4 source address has been assigned and if the protocol used to transmit the outgoing request is IPv6, then the request module 210 determines whether an IPv6 source address has been assigned.

If there is not an outgoing source IP address assigned, then flow moves to operation 425; otherwise flow moves to operation 446. At operation 425, the source IP address selection module 245 selects an IP address from the IP address pool 325 for use as the source IP address in the outgoing request. In implementations where the cloud-based proxy service includes an incompatible network gateway service (e.g., IPv4 to IPv6), the source IP address selection module 245 determines the protocol used to transmit the outgoing request (e.g., IPv4 or IPv6) prior to selecting the IP address for the source IP address of the outgoing request.

The IP address selection module may cause an IP address to be selected differently in different embodiments. In one embodiment, the source IP address selection is based on input of one or more of the extracted parameters of the request (e.g., the source IP address of the incoming request, the requested domain (e.g., as indicated in the Host header of an HTTP request) of the incoming request, the source port of the incoming request, cookie(s) of the incoming request, session identifier(s) of the incoming request (if different than the cookie(s)), or any combination of the same).

By way of a specific example, in one embodiment the source IP address selection module 245 performs a hash function on one or more of the extracted parameters to index into the IP address pool 325 when selecting an IP address. The hash function may be a consistent hash function such that the same parameter(s) applied to the hash function produces the same value to index into the IP address pool 325. A number of hash functions may be used, including, but not limited to non-cryptographic hash functions such as simple mod-based hash functions, MurmurHash, etc., and cryptographic hash functions such as Secure Hash Algorithm (SHA).

By way of another specific example, in one embodiment the source IP address selection module 245 selects an IP address from the IP address pool 325 in a predefined order. For example, the source IP address selection module 245 may select the IP address that is the least recently used to send outgoing requests across all origin servers. The source IP address selection module 245 may access the IP address statistics 340 to determine which IP address is least recently used. As another example, the source IP address selection module 245 may select the IP address that is the least recently used to send an outgoing request to the origin server of the requested domain. The source IP address selection module 245 may access the origin server parameters 230 to determine which IP address is the least recently used IP address to send an outgoing request to the origin server of the requested domain.

By way of another specific example, in one embodiment the source IP address selection module 245 selects an IP address from the IP address pool 325 that has been used as the source IP address for the least number of requests over a predefined amount of time to the origin server of the requested domain. The source IP address selection module 245 may access the origin server parameters 230 to determine the number of requests to the origin server of the requested domain over a predefined amount of time each IP address of the IP address pool 325 has been used as a source IP address. In this embodiment, the source IP address selection module 245 tracks the number of requests sent to an origin server using a particular IP address.

By way of yet another specific example, in one embodiment, for those origin servers that do not support performance logic, the source IP address selection module 245 may select any of the IP addresses of the IP address pool 325, which may be made consistent across multiple requests and multiple different request parameters. For example, the source IP address selection module 245 may cause a single (or a few) IP addresses to be used for requests from all visitors to origin severs that do not support performance logic. In one embodiment, whether an origin server implements performance logic is stored in the origin server parameters 230, which may be configured by the operator of the origin server (e.g., during or after registration using the service server 125) and/or based on prior experiences of transmitting multiple requests with the same IP address over a given time period to the origin server.

By way of another specific example, in one embodiment the source IP address selection module 245 selects an IP address from the IP address pool 325 randomly.

Flow moves from 425 to operation 428 where the destination IP address selection module 250 selects an IP address of the origin server for use as the destination IP address in the outgoing request. In some circumstances the origin server may only have a single IP address for the requested domain, while in other circumstances the origin server has multiple IP addresses for the requested domain (e.g., a set of one or more IPv4 addresses and/or a set of one or more IPv6 addresses).

The destination IP address selection module 250 may select the destination IP address based on a set of one or more destination address rules that are configured by the customer of the requested domain. The destination address rules may indicate one or more of: which one of the multiple IP addresses to send the request to, a destination selection algorithm (e.g., round-robin, IP address least recently used, the IP address whose corresponding connection has the lowest latency, the IP address that is the least used), and a particular IP protocol preference. For example, the destination IP address selection module 250 accesses the origin server parameters 230 to determine the destination address rules. In one embodiment, if there are no destination address rules, the destination IP address selection module 250 selects one of the origin server's IP addresses (e.g., round-robin, IP address least recently used, the IP address whose corresponding connection has the lowest latency, the IP address that is the least used, etc.). Flow moves from operation 428 to operation 430.

At operation 430, the source IP address selection module 245 causes the mapping between the selected source IP address and the parameter(s) to be stored in the outgoing source IP address mapping structure 345 and the destination IP address selection module 250 causes the mapping the selected destination IP address and the parameter(s) to be stored in the outgoing destination IP address mapping structure 355. Flow then moves to operation 435 where the outgoing request is transmitted to the origin server of the requested domain using the outgoing source IP address 330 and the outgoing destination IP address 332. Flow then moves to operation 455 where a counter for the outgoing source IP address and/or a counter for the outgoing destination IP address for requests to the requested domain is incremented, and flow moves back to operation 410. The operation 455 is optional and may not be performed in all embodiments; in such a case flow moves from operation 435 back to operation 410.

If there is an outgoing source IP address assigned, then flow moves from operation 420 to operation 446. At operation 446, a determination is made whether there is an outgoing destination IP address assigned for use in the outgoing request. For example, the destination IP address selection module 250 accesses the outgoing destination IP address mapping structure 355 to determine whether there is an outgoing destination IP address that is mapped to one or more of the parameter(s) extracted from the request. If there is not an outgoing destination IP address assigned, then flow moves to operation 448; otherwise flow moves to operation 450.

At operation 448, the destination IP address selection module 250 selects an IP address of the origin server for use as the destination IP address in the outgoing request. The destination IP address selection module 250 may select an IP address of the origin server in a similar way as described with respect to operation 428. Flow moves from operation 448 to operation 450.

At operation 450, the outgoing request is transmitted to the origin server of the requested domain with the selected outgoing source IP address 330 and destination IP address 332. Flow then moves to operation 455, which is optional in some embodiments.

If source IP address persistency is not desired, then flow moves from operation 415 to operation 440. At operation 440, the source IP address selection module 245 selects an IP address from the IP address pool. In implementations where the cloud-based proxy service includes an incompatible network gateway service (e.g., IPv4 to IPv6), the source IP address selection module 245 determines the protocol used to transmit the outgoing request (e.g., IPv4 or IPv6) prior to selecting the IP address for the source IP address of the outgoing request. The source IP address selection module 245 may select the IP address in a similar way as described with reference to operation 425.

Flow then moves from operation 440 to operation 442 where the destination IP address selection module 250 selects an IP address of the origin server for use as the destination IP address in the outgoing request. The destination IP address selection module 250 may select an IP address of the origin server in a similar way as described with respect to operation 428. Flow moves from operation 442 to operation 445 where the outgoing request is transmitted to the origin server of the requested domain with the selected outgoing source IP address 330 and destination IP address 332. Flow then moves to operation 455, which is optional in some embodiments.

As described above, in some embodiments, the cloud-based proxy service includes an incompatible network gateway service. By way of a specific example, the incompatible network gateway service is an IPv4 to IPv6 gateway service. In an IPv4 to IPv6 gateway request, after receiving a request, the proxy server determines which IP version to use when transmitting the request to the origin server. The IP version used for the connection between the proxy server and the origin server is independent of the IP version used for the connection between the client device and the proxy server. For example, table 1 illustrates the possible connection types:

TABLE 1

| Connection Between Client Device and Proxy Server | Connection Between Proxy Server and Origin Server |
|---|---|
| IPv4 | IPv4 |
| IPv4 | IPv6 |
| IPv6 | IPv4 |
| IPv6 | IPv6 |

The proxy server transitions between IP versions for those requests that are received using a particular IP version and are to be transmitted to the destination origin server using a different IP version. For example, the proxy server translates an IPv4 request received from a client device to an IPv6 request responsive to determining to transmit that request to the origin server using IPv6. As a similar example, the proxy server translates an IPv6 request received from a client device to an IPv4 request responsive to determining to transmit that request to the origin server using IPv4.

The proxy server also transitions between IP versions for those responses that are received using a particular IP version and are to be transmitted to the requesting client device using a different IP version. For example, the proxy server translates an IPv4 response received from an origin server to an IPv6 response responsive to determining that the original request from the client device used IPv6. As a similar example, the proxy server translates an IPv6 response received from an origin server to an IPv4 response responsive to determining that the original request from the client device used IPv4.

With reference back to FIG. 2, the request module 210 includes the request transition module 225 that transitions between IP versions for requests that are received using a particular IP version and are to be transmitted to the destination origin server using a different IP version. For example, the request transition module 225 may transition an incoming IPv4 request to be an outgoing IPv6 request such that an IPv4 client can submit requests to an IPv6 origin server via the proxy server 120, and transition an incoming IPv6 request to be an outgoing IPv4 request such that an IPv6 client can submit requests to an IPv4 origin server via the proxy server 120.

In one embodiment, the request module 210 determines whether to transition to a different protocol type based on whether the destination origin server supports the IP version type in which the incoming request was received. For example, if an incoming request is received using IPv4 and the request module 210 determines that the destination origin server does not support IPv4, the transition module 225 transitions to transmitting the outgoing request using IPv6. Similarly, if an incoming request is received using IPv6 and the request module 210 determines that the destination origin server does not support IPv6, the transition module 225 transitions to transmitting the outgoing request using IPv4.

In one embodiment, the IP version type supported by a destination origin server is stored in the origin server parameter data structure 230, which may be populated as a result of configuration by the customer (e.g., during the registration process or sometime after). The request module 210 may also test whether a particular origin supports IPv4 and/or IPv6 by making a request over IPv4 and/or IPv6 respectively and recording the result(s) in the origin server parameter data structure 230. In one embodiment, the origin server parameter data structure 230 includes a set of one or more IPv4 addresses mapped to a customer's domain and/or a set of one or more IPv6 addresses mapped to the customer's domain.

In another embodiment, the request module 210 determines whether to transition to a different protocol type based on a set of one or more rules, which are typically specified by the customer in control of the domain. For example, the rules may indicate that the outgoing requests for a domain are to be transmitted to IP addresses of the destination origin server in an ordered fashion (e.g., round-robin) or unordered fashion (e.g., random) regardless of the protocol version type. As another example, the rules may indicate that the outgoing requests for a domain are to be transmitted to the IP address of the destination origin server that is experiencing the least amount of latency. As another example, the rules may indicate a preference to use one or more of the IP addresses.

When transitioning to a different IP version type for an outgoing request, in one embodiment the transition module 225 replaces the IP header of the IP packet carrying the incoming request with an IP header of the different IP version type for the IP packet carrying the outgoing request. For example, if the incoming request is an IPv4 request, the transition module 225 replaces the IPv4 header of the IP packet carrying the incoming request with an IPv6 header for the IP packet carrying the outgoing request. Similarly, if the incoming request is an IPv6 request, the transition module 225 replaces the IPv6 header of the IP packet carrying the incoming request with an IPv4 header of the IP packet carrying the outgoing request.

In another embodiment, the transition module 225 encapsulates the packet carrying the incoming request into a packet of a different protocol type when transitioning to a different IP version type for an outgoing request. For example, if the incoming request is an IPv4 request, the transition module 225 encapsulates the IPv4 packet carrying that request into an IPv6 packet. Similarly, if the incoming request is an IPv6 request, the transition module 225 encapsulates the IPv6 packet into an IPv4 packet.

The proxy server 120 also transitions between IP versions for those responses (e.g., HTTP responses, HTTPS responses) that are received using a particular IP version and are to be transmitted to the client device using a different IP version. With reference to FIG. 2, the response module 220 includes the response transition module 235 that transitions between IP versions for incoming responses that are received using a particular IP version and are to be transmitted to the requesting client device using a different IP version. For example, the response transition module 235 may transition an incoming IPv4 response to be an outgoing IPv6 response such that an origin server using IPv4 can transmit responses (e.g., HTTP responses, HTTPs responses) to clients using IPv6 via the proxy server 120, and transition an incoming IPv6 response to be an outgoing IPv4 response such that an origin server using IPv6 can transmit responses to a client using IPv4 via the proxy server 120.

The proxy server 120 also transitions between IP versions for those responses (e.g., HTTP responses, HTTPS responses) that are received using a particular IP version and are to be transmitted to the client device using a different IP version. The proxy server(s) 120 may transmit incoming responses received on the IPv4 connection 164 using the IPv6 connection 162 and may transmit incoming responses received on the IPv6 connection 166 using the IPv4 connection 160. For example, responsive to the proxy server 120 receiving a response (e.g., an HTTP response, HTTPs response) from an origin server 130 on the IPv4 connection 164 and determining that the response is to be transmitted to the requesting client device 110 using the IPv6 connection 162 (e.g., because the corresponding request used the IPv6 connection 162), the proxy server 120 transmits the response on the IPv6 connection 162. Responsive to the proxy server 120 receiving a response (e.g., an HTTP response, HTTPs response) from an origin server 130 on the IPv6 connection 166 and determining that the response is to be transmitted to the requesting client device 110 using the IPv4 connection 160 (e.g., because the corresponding request used the IPv4 connection 160), the proxy server 120 transmits the response on the IPv4 connection 160.

With reference to FIG. 2, the response module 220 includes the response transition module 235 that transitions between IP versions for incoming responses that are received using a particular IP version and are to be transmitted to the requesting client device using a different IP version. For example, the response transition module 235 may transition an incoming IPv4 response to be an outgoing IPv6 response such that an origin server using IPv4 can transmit responses (e.g., HTTP responses, HTTPs responses) to clients using IPv6 via the proxy server 120, and transition an incoming IPv6 response to be an outgoing IPv4 response such that an origin server using IPv6 can transmit responses to a client using IPv4 via the proxy server 120.

Figure 5:
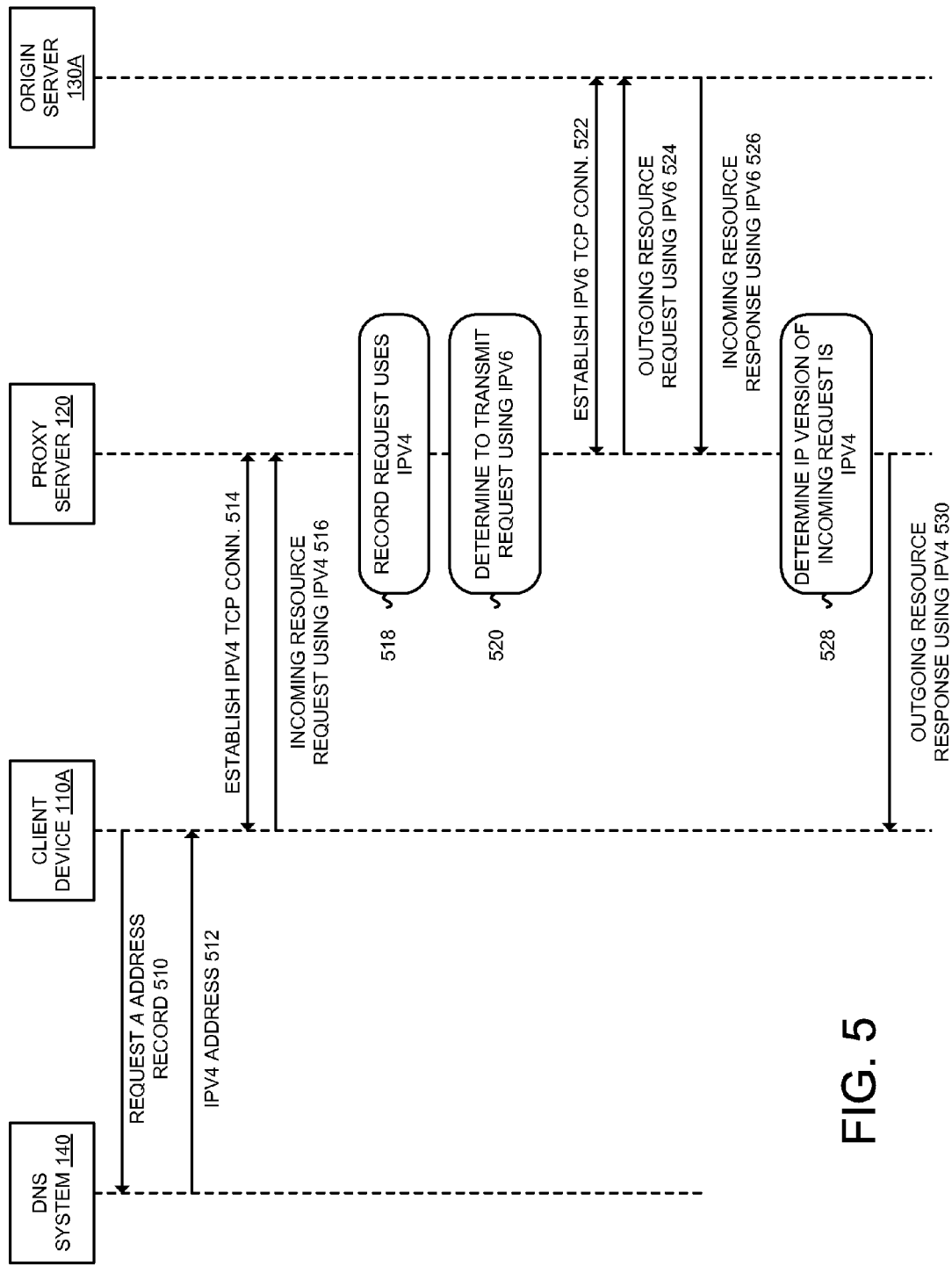
FIG. 5 is a data flow diagram that illustrates exemplary operations for an IPv4 to IPv6 gateway proxy service according to one embodiment.

FIG. 5 is a data flow diagram that illustrates exemplary operations for an IPv4 to IPv6 gateway proxy service according to one embodiment. The operations of FIG. 5 are described with reference to the exemplary embodiments of FIG. 2. However, it should be understood that the operations of FIG. 5 can be performed by embodiments other than those discussed with reference to FIG. 2, and the embodiments discussed with reference to FIG. 2 can perform operations other than those discussed with reference to FIG. 5.

At operation 510, the client device 110A requests an "A" resource record from the DNS system 140 for a domain. For purposes of this figure, the client device 110A requests an IPv4 address for example.com (thus, the client device 110A is an IPv4 enabled client). Next, at operation 512, the DNS system 140 returns to the client device 110A an IPv4 address that is mapped to the record for the requested domain. The IPv4 address is an address of the proxy server 120.

Next, at operation 514, the client device 110A and the proxy server 120 establish a TCP connection. This TCP connection is referred herein as an IPv4 TCP connection since the client device 110A initiates the TCP connection with the IPv4 address of the proxy server 120. After the TCP connection is established, at operation 516, the client device 110A transmits an IPv4 packet that includes a resource request (e.g., an HTTP request, an HTTPS request) to the IPv4 address of the proxy server 120.

The proxy server 120 receives the request. In one embodiment, the connection between the client device 110A and the proxy server 120 remains open at least until the proxy server 120 transmits a response to client device 110A or the connection is terminated due to timeouts, connection resets or other abnormal termination events. In another embodiment, the connection between the client device 110A and the proxy server 120 is not kept open. In such an embodiment, the proxy server 120 records the IP version that carries the incoming request at operation 518. For example, with reference to FIG. 2, the request module 210 receives the incoming request from the client device 110A and records, in the connections data store 215, that the incoming request was received in an IPv4 packet. Of course, even in an embodiment where the connection is kept open, the proxy server 120 may store that the request arrived in an IPv4 packet.

Next, at operation 520, the proxy server 120 determines to transmit the request in an IPv6 packet to an IPv6 address of the destination origin server 130A (e.g., which hosts the resource corresponding to example.com). For example, the proxy server 120 accesses the origin server parameter data structure 230 as part of determining to transmit the request in an IPv6 packet to an IPv6 address of the destination origin server 130A. The determination to transmit the request to an IPv6 address (and which IPv6 address if there are multiple addresses) of the destination origin server 130A may be based on a number of destination address rules.

At operation 522, the proxy server 120 and the destination origin server 130A establish a TCP connection. This TCP connection is referred herein as an IPv6 TCP connection since the proxy server 120 initiates the TCP connection with an IPv6 address of the destination origin server 130A. In some cases, a suitable TCP connection may already be established between the proxy server 120 and the origin server 130A (e.g., if a single TCP connection is used for multiple requests, which may be sent from multiple, different, client devices). In such cases, the operation 522 may be skipped and the existing IPv6 TCP connection may be used.

Next, at operation 524, the proxy server 120 transmits an IPv6 packet that includes the request to the IPv6 address of the destination origin server 130A. For example, with reference to FIG. 2, in one embodiment the request transition module 225 replaces the IPv4 header of the packet carrying the incoming request with an IPv6 header for the packet that will carry the outgoing request. The IPv6 header includes a source IPv6 address of the proxy server 120 and the destination address is the IPv6 address of the destination origin server 130. In another embodiment, the proxy server 120 encapsulates the IPv4 packet into an IPv6 packet. In one embodiment, the proxy server 120 adds information about the original request (e.g., in the x-forwarded header or other header) that includes the IP address of the client device 110A.

In one embodiment, the proxy server 120 includes multiple IPv6 addresses that can be used as the source address of the outgoing request and selects one of those IPv6 addresses to use as the outgoing source IP address in the outgoing request. The selection of the IPv6 address for the source address of the outgoing request may be similar as that described with respect to FIGS. 3 and 4.

Prior to transmitting the outgoing request to the origin server 130A, the proxy server 120 may modify the request (e.g., remove some content of the HTTP request, add content to the HTTP request, etc.).

The destination origin server 130A transmits an IPv6 packet carrying the response (e.g., an HTTP response, an HTTPS response) to the IPv6 address of the proxy server 120 at operation 526. The proxy server 120 receives the IPv6 packet and determines the IP version of the packet that carried the incoming request at operation 528. For example, with reference to FIG. 2, the response module 220 accesses the connections data structure 215 to determine the IP version of the packet that carried the incoming request, which is in this example IPv4.

The proxy server 120 then transmits an IPv4 packet with the response to the IPv4 address of the client device 110A at operation 530. In one embodiment, the proxy server 120 replaces the IP header of the packet carrying the incoming response received from the origin server 130A with an IP header of the different IP version type for the packet that will carry the outgoing response to the client device 110A. For example, the response transition module 235 replaces the IPv6 header of the packet carrying the incoming response with an IPv4 header for the packet that will carry the outgoing response to the client device 110A. The source address in the IPv4 header for the packet that will carry the outgoing response is the same as the IPv4 destination address in the packet carrying the incoming request received from the client device 110A.

The outgoing response transmitted to the client device 110A is based on the incoming response received from the origin server 130A. In one embodiment, the incoming response and the outgoing response (e.g., the HTTP responses) are identical or substantially identical. In other embodiments, the proxy server 120 modifies the outgoing response prior to transmission. For example, the proxy server 120 may remove content of the HTTP response, add content to the HTTP response, modify content of the HTTP response, re-order content of the HTTP response, etc.

Subsequent requests and responses between the client device 110 and the origin server 130A are processed with similar operations, and may use the same TCP connections established in operations 514 and/or 522 or may use different TCP connections between the client device 110A and the proxy server 120 and/or between the proxy server 120 and the origin server 130A. In addition, subsequent requests originating between the client device 110 and the origin server 130A may use the same outgoing source IP address and/or the same outgoing destination IP address. By way of a specific example, the proxy server 120 may use the same outgoing source IP address and the same outgoing destination address for subsequent requests of the same HTTP session proxied between the client device 110 and the origin server 130A.

Figure 6:
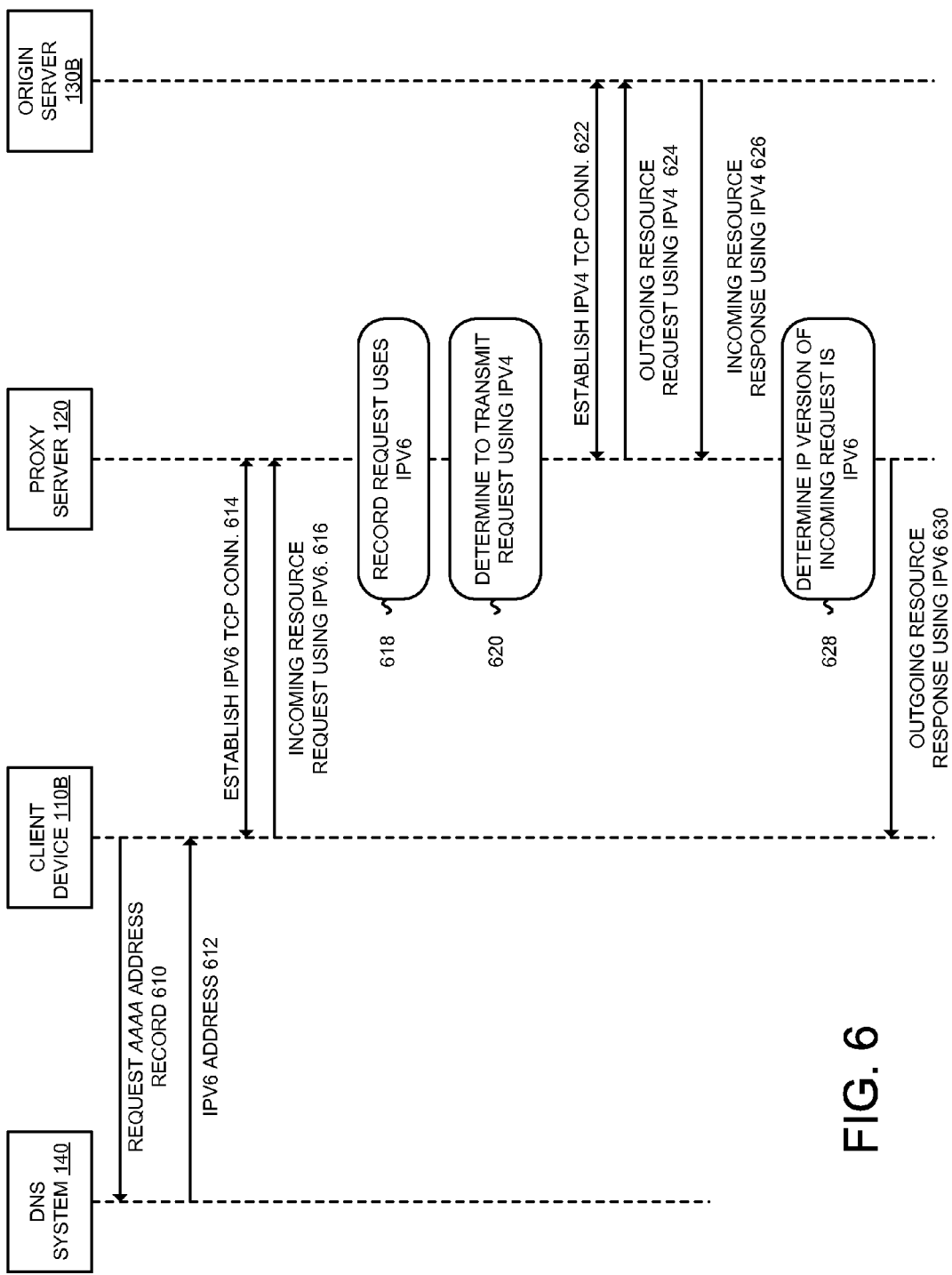
FIG. 6 is a data flow diagram that illustrates exemplary operations for an IPv6 to IPv4 gateway proxy service according to one embodiment.

FIG. 6 is a data flow diagram that illustrates exemplary operations for an IPv6 to IPv4 gateway proxy service according to one embodiment. The operations of FIG. 6 are described with reference to the exemplary embodiments of FIG. 2. However, it should be understood that the operations of FIG. 6 can be performed by embodiments other than those discussed with reference to FIG. 2, and the embodiments discussed with reference to FIG. 2 can perform operations other than those discussed with reference to FIG. 6.

At operation 610, the client device 110B requests an "AAAA" resource record from the DNS system 140 for a domain. For purposes of this figure, the client device 110B requests an IPv6 address for example.com (thus, the client device 110B is an IPv6 enabled client). Next, at operation 612, the DNS system 140 returns to the client device 110B an IPv6 address that is mapped to the record for the requested domain. The IPv6 address is an address of the proxy server 120.

The client device 110B and the proxy server 120 then establish an IPv6 TCP connection at operation 614. After the IPv6 TCP connection is established, at operation 616, the client device 110B transmits an IPv6 packet that includes a resource request (e.g., an HTTP request, an HTTPS request) to the IPv6 address of the proxy server 120.

The proxy server 120 receives the request. In one embodiment, the connection between the client device 110B and the proxy server 120 remains open at least until the proxy server 120 transmits a response to client device 110B or the connection is terminated due to timeouts, connection resets or other abnormal termination events. In another embodiment, the connection between the client device 110B and the proxy server 120 is not kept open. In such an embodiment, the proxy server 120 records the IP version that carries the incoming request at operation 618. For example, with reference to FIG. 2, the request module 210 receives the incoming request from the client device 110B and records, in the connections data store 215, that the incoming request was received in an IPv6 packet. Of course, even in an embodiment where the connection is kept open, the proxy server 120 may store that the request arrived in an IPv6 packet.

Next, at operation 620, the proxy server 120 determines to transmit the request in an IPv4 packet to an IPv4 address of the destination origin server 130B. For example, the proxy server 120 accesses the origin server parameter data structure 230 as part of determining to transmit the request in an IPv4 packet to an IPv4 address of the destination origin server 130B. The determination to transmit the request to an IPv4 address (and which IPv4 address if there are multiple addresses) of the destination origin server 130B may be based on a number of destination address rules.

At operation 622, the proxy server 120 and the destination origin server 130B establish an IPv4 TCP connection. In some cases, the IPv4 TCP connection may already be established between the proxy server 120 and the origin server 130B (e.g., if a single TCP connection is used for multiple requests, which may be sent from multiple, different, client devices). In such cases, the operation 622 may be skipped and the existing IPv4 TCP connection may be used.

Next, at operation 624, the proxy server 120 transmits an IPv4 packet that includes the request to the IPv4 address of the destination origin server 130B. For example, with reference to FIG. 2, in one embodiment the request transition module 225 replaces the IPv6 header of the packet carrying the incoming request with an IPv4 header for the packet that will carry the outgoing request. The IPv4 header includes an IPv4 source address of the proxy server 120 and an IPv4 destination address of the destination origin server 130. In another embodiment, the proxy server 120 encapsulates the IPv6 packet into an IPv4 packet. In one embodiment, the proxy server 120 adds information about the original request (e.g., in the x-forwarded header or other header) that includes the IP address of the client device 110B.

In one embodiment, the proxy server 120 includes multiple IPv4 addresses that can be used as the source address of the outgoing request and selects one of those IPv4 addresses to use as the outgoing source IP address in the outgoing request. The selection of the IPv4 address for the source address of the outgoing request may be similar as that described with respect to FIGS. 3 and 4. The outgoing request transmitted to the origin server 130B is based on the incoming request received from the client device 110B. In one embodiment, the incoming request and the outgoing request (e.g., the HTTP request) are identical or substantially identical. In other embodiments, the proxy server 120 may modify the outgoing request prior to transmission (e.g., remove some content of the HTTP request, add content to the HTTP request, etc.).

The destination origin server 130B transmits an IPv4 packet carrying the response (e.g., an HTTP response, an HTTPs response) to the IPv4 address of the proxy server 120 at operation 624. The proxy server 120 receives the IPv4 packet and determines the IP version of the packet that carried the incoming request at operation 628. For example, with reference to FIG. 2, the response module 220 access the connections data structure 215 to determine the IP version of the packet that carried the incoming request, which is in this example IPv6.

The proxy server 120 then transmits an IPv6 packet with the response to the IPv6 address of the client device 110B at operation 630. In one embodiment, the proxy server 120 replaces the IP header of the packet carrying the incoming response received from the origin server 130B with an IP header of the different IP version type for the packet that will carry the outgoing response to the client device 110B. For example, the response transition module 235 replaces the IPv4 header of the packet that carried the incoming response with an IPv6 header for the packet that will carry the outgoing response to the client device 110B. The source address in the IPv6 header of the packet that will carry the outgoing response is the same as the IPv6 destination address in the packet that carried the incoming request received from the client device 110A.

The outgoing response transmitted to the client device 110B is based on the incoming response received from the origin server 130B. In one embodiment, the incoming response and the outgoing response (e.g., the HTTP responses) are identical or substantially identical. In other embodiments, the proxy server 120 modifies the outgoing response prior to transmission. For example, the proxy server 120 may remove content of the HTTP response, add content to the HTTP response, modify content of the HTTP response, re-order content of the HTTP response, etc.

Subsequent requests and responses originating between the client device 110B and the origin server 130B are processed with similar operations, and may use the same TCP connections established in operations 614 and/or 622 or may use different TCP connections between the client device 110B and the proxy server 120 and/or between the proxy server 120 and the origin server 130B. In addition, subsequent requests originating between the client device 110 and the origin server 130B may use the same outgoing source IP address and/or the same outgoing destination IP address. By way of a specific example, the proxy server 120 may use the same outgoing source IP address and the same outgoing destination address for subsequent requests of the same HTTP session proxied between the client device 110 and the origin server 130B.

Figure 7:
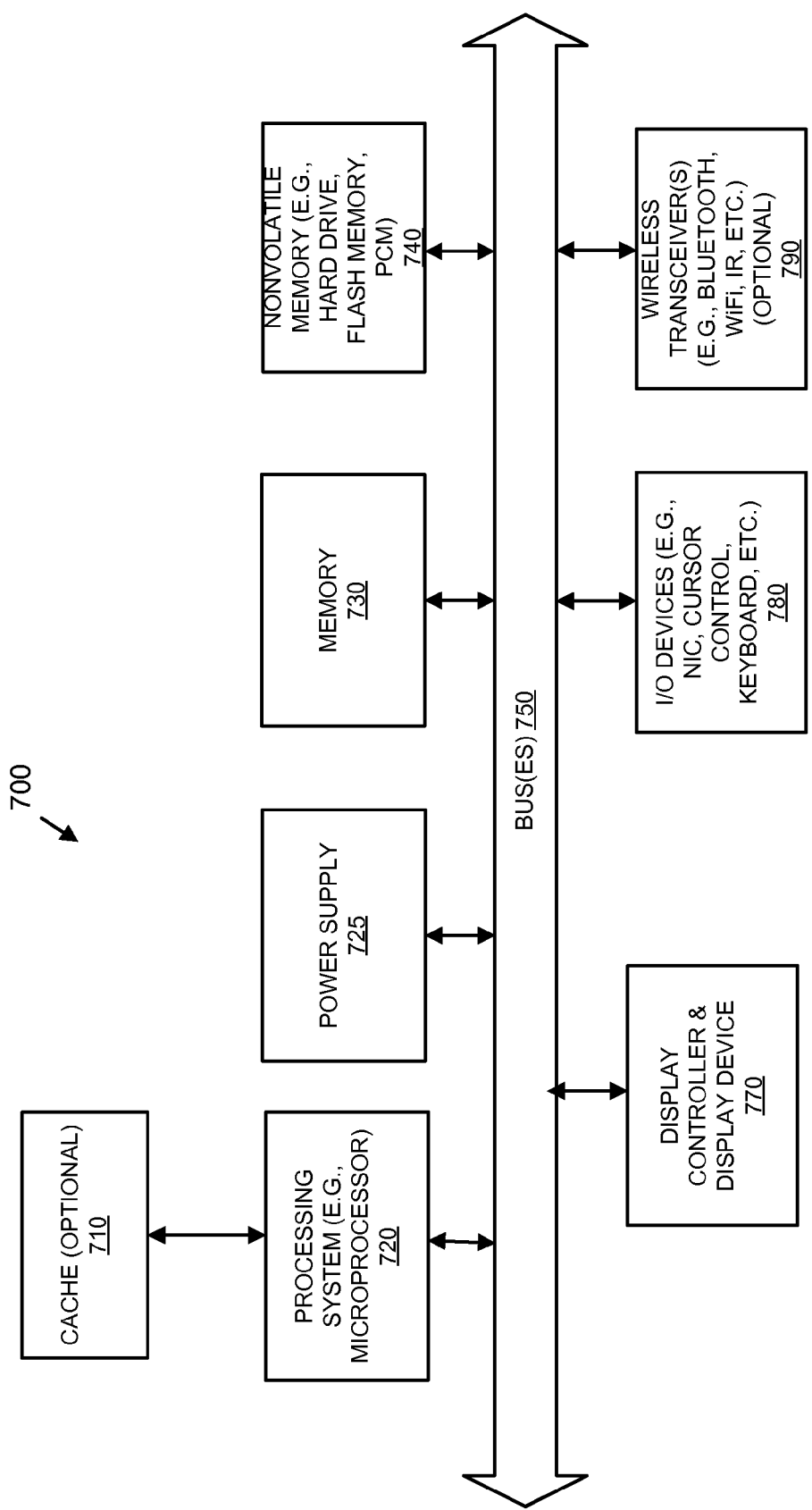
FIG. 7 is a block diagram of a computer system that can be used in embodiments of the invention.

As illustrated in FIG. 7, the computer system 700, which is a form of a data processing system, includes the bus(es) 750 which is coupled with the processing system 720, power supply 725, memory 730, and the nonvolatile memory 740 (e.g., a hard drive, flash memory, Phase-Change Memory (PCM), etc.). The bus(es) 750 may be connected to each other through various bridges, controllers, and/or adapters as is well known in the art. The processing system 720 may retrieve instruction(s) from the memory 730 and/or the nonvolatile memory 740, and execute the instructions to perform operations described herein. The bus 750 interconnects the above components together and also interconnects those components to the display controller & display device 770, Input/Output devices 780 (e.g., NIC (Network Interface Card), a cursor control (e.g., mouse, touchscreen, touchpad, etc.), a keyboard, etc.), and the optional wireless transceiver(s) 790 (e.g., Bluetooth, WiFi, Infrared, etc.). In one embodiment, the client devices 110A-I, the service server 125, the proxy server(s) 120, and/or the origin servers 130A-L can take the form of the computer system 700.

The techniques shown in the figures can be implemented using code and data stored and executed on one or more computing devices (e.g., client devices, servers, etc.). Such computing devices store and communicate (internally and/or with other computing devices over a network) code and data using machine-readable media, such as machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in a proxy server of a cloud-based proxy service, comprising:

receiving, from a client, a first packet that includes a first incoming request for an action to be performed on an identified resource, wherein the first packet is received at the proxy server as a result of a Domain Name System (DNS) request for a domain corresponding to the identified resource resolving to an Internet Protocol (IP) address of the proxy server;

selecting a first IP address from a plurality of IP addresses of a same IP protocol version type of the proxy server for use as a source IP address for a second packet that carries a first outgoing request to be transmitted by the proxy server to a destination origin server, wherein the step of selecting is based at least in part on a set of one or more parameters associated with the first packet;

transmitting the second packet that includes the first outgoing request to the destination origin server that hosts the identified resource, wherein the first outgoing request is based on the first incoming request, wherein the second packet includes the selected first IP address as the source IP address of the second packet;

receiving a third packet that includes a first incoming response from the destination origin server in response to the first outgoing request; and transmitting a fourth packet to the client, the fourth packet including a first outgoing response that is based on the first incoming response.

2. The method of claim 1, wherein the step of selecting the first one of the plurality of IP addresses includes using a hash function on one or more of the set of parameters to select the first one of the plurality of IP addresses.

3. The method of claim 1, wherein the first one of the plurality of IP addresses is a least recently used IP address of the plurality of IP addresses for the destination origin server.

4. The method of claim 1, wherein the selected first one of the plurality of IP addresses is the IP address of the proxy server that has been used as a source IP address for outgoing requests to a destination origin server a least number of times compared to other ones of the plurality of IP addresses that have been used as source IP addresses for outgoing requests to the destination origin server.

5. The method of claim 1, wherein the set of parameters include one or more of: a source IP address of the first packet, a source port of the first packet, the requested domain of the incoming request, a type of content of the identified resource, and one or more cookies associated with the incoming request.

6. The method of claim 1, wherein prior to the step of transmitting the second packet, selecting one of a plurality of IP address of the destination origin server for a destination IP address of the second packet, wherein the step of selecting is based on a set of one or more destination address rules configured by an owner of the domain.

7. The method of claim 1, further comprising:
receiving, from the client, a fifth packet that includes a second incoming request for an action to be performed on an identified resource at the domain; and
transmitting a sixth packet that includes a second outgoing request to the destination origin server, wherein the sixth packet includes the first IP address as a source IP address of the sixth packet.

8. The method of claim 7, wherein the first outgoing request and the second outgoing request are related to a same session.

9. The method of claim 1, further comprising:
receiving, from the client, a fifth packet that includes a second incoming request for an action to be performed on an identified resource at the domain;
selecting a second one of the plurality of IP addresses of the proxy server for use as a source IP address based at least in part on a set of one or more parameters associated with the fifth packet; and
transmitting a sixth packet that includes a second outgoing request to the destination origin server, wherein the sixth packet includes the second IP address as a source IP address of the sixth packet, and wherein the first outgoing request and the second outgoing request are not related to a same session.

10. A method in a proxy server of a cloud-based proxy service, comprising:
receiving, from a plurality of clients a plurality of first incoming requests respectively, wherein each incoming request is for an action to be performed on an identified resource and is received at the proxy server as a result of a Domain Name System (DNS) request for a same domain corresponding to the identified resource resolving to an Internet Protocol (IP) address of the proxy server;
for each first incoming request, creating a first outgoing request to transmit to a destination origin server that hosts the resource identified in that first incoming request;
for each of the first outgoing requests, selecting an IP address from a plurality of IP addresses of a same IP protocol version type of the proxy server to use as a source IP address for that first outgoing request, wherein a number of the plurality of IP addresses is less than a number of the plurality of clients; and
transmitting each of the first outgoing requests to the destination origin server.

11. The method of claim 10, wherein the step of selecting the IP address from the plurality of IP addresses of the proxy server include performing, for each of the first incoming requests, a hash function on one or more parameters of that first incoming request to select one of the plurality of IP address of the proxy server.

12. The method of claim 10, wherein the step of selecting each IP address from the plurality of IP addresses of the proxy server include an ordered selection of the plurality of IP addresses based on incoming request arrival.

13. The method of claim 10, further comprising:
receiving, from a first one of the plurality of clients, a set of one or more second incoming requests, wherein each second incoming request is for an action to be performed on an identified resource of the same domain as the first incoming requests;
for each of the set of second incoming requests, creating a second outgoing request to transmit to the destination origin server that hosts the resource identified in that second incoming request; and
transmitting each second outgoing request from a same IP address of the proxy server as used in the first outgoing request transmitted for the first one of the plurality of clients.

14. A non-transitory machine-readable storage medium that provides instructions that, when executed by a processor of a proxy server of a cloud-based proxy service, cause said processor to perform operations comprising:
receiving, from a client, a first packet that includes a first incoming request for an action to be performed on an identified resource, wherein the first packet is received at the proxy server as a result of a Domain Name System (DNS) request for a domain corresponding to the identified resource resolving to an Internet Protocol (IP) address of the proxy server;
selecting a first IP address from a plurality of IP addresses of a same IP protocol version type of the proxy server for use as a source IP address for a second packet that carries a first outgoing request to be transmitted by the proxy server to a destination origin server, wherein the step of selecting is based at least in part on a set of one or more parameters associated with the first packet;
transmitting the second packet that includes the first outgoing request to the destination origin server that hosts the identified resource, wherein the first outgoing request is based on the first incoming request, wherein the second packet includes the selected first IP address as the source IP address of the second packet;
receiving a third packet that includes a first incoming response from the destination origin server in response to the first outgoing request; and
transmitting a fourth packet to the client, the fourth packet including a first outgoing response that is based on the first incoming response.

15. The non-transitory machine-readable storage medium of claim 14, wherein the step of selecting the first one of the plurality of IP addresses includes using a hash function on one or more of the set of parameters to select the first one of the plurality of IP addresses.

16. The non-transitory machine-readable storage medium of claim 14, wherein the first one of the plurality of IP addresses is a least recently used IP address of the plurality of IP addresses for the destination origin server.

17. The non-transitory machine-readable storage medium of claim 14, wherein the selected first one of the plurality of IP addresses is the IP address of the proxy server that has been used as a source IP address for outgoing requests to a destination origin server a least number of times compared to other ones of the plurality of IP addresses that have been used as source IP addresses for outgoing requests to the destination origin server.

18. The non-transitory machine-readable storage medium of claim 14, wherein the set of parameters include one or more of: a source IP address of the first packet, a source port of the first packet, the requested domain of the incoming request, a type of content of the identified resource, and one or more cookies associated with the incoming request.

19. The non-transitory machine-readable storage medium of claim 14, wherein prior to the step of transmitting the second packet, selecting one of a plurality of IP address of the destination origin server for a destination IP address of the second packet, wherein the step of selecting is based on a set of one or more destination address rules configured by an owner of the domain.

20. The non-transitory machine-readable storage medium of claim 14, further comprising instructions, that when executed by the processor, cause the processor to perform the following:
receiving, from the client, a fifth packet that includes a second incoming request for an action to be performed on an identified resource at the domain; and
transmitting a sixth packet that includes a second outgoing request to the destination origin server, wherein the sixth packet includes the first IP address as a source IP address of the sixth packet.

21. The non-transitory machine-readable storage medium of claim 20, wherein the first outgoing request and the second outgoing request are related to a same session.

22. The non-transitory machine-readable storage medium of claim 14, further comprising instructions, that when executed by the processor, cause the processor to perform the following:
receiving, from the client, a fifth packet that includes a second incoming request for an action to be performed on an identified resource at the domain;
selecting a second one of the plurality of IP addresses of the proxy server for use as a source IP address based at least in part on a set of one or more parameters associated with the fifth packet; and
transmitting a sixth packet that includes a second outgoing request to the destination origin server, wherein the sixth packet includes the second IP address as a source IP address of the sixth packet, and wherein the first outgoing request and the second outgoing request are not related to a same session.

23. A non-transitory machine-readable storage medium that provides instructions that, when executed by a processor of a proxy server of a cloud-based proxy service, cause said processor to perform operations comprising:
receiving, from a plurality of clients a plurality of first incoming requests respectively, wherein each incoming request is for an action to be performed on an identified resource and is received at the proxy server as a result of a Domain Name System (DNS) request for a same domain corresponding to the identified resource resolving to an Internet Protocol (IP) address of the proxy server;
for each first incoming request, creating a first outgoing request to transmit to a destination origin server that hosts the resource identified in that first incoming request;
for each of the first outgoing requests, selecting an IP address from a plurality of IP addresses of a same IP protocol version type of the proxy server to use as a source IP address for that first outgoing request, wherein a number of the plurality of IP addresses is less than a number of the plurality of clients; and
transmitting each of the first outgoing requests to the destination origin server.

24. The non-transitory machine-readable storage medium of claim 23, wherein the step of selecting the IP address from the plurality of IP addresses of the proxy server include performing, for each of the first incoming requests, a hash function on one or more parameters of that first incoming request to select one of the plurality of IP address of the proxy server.

25. The non-transitory machine-readable storage medium of claim 23, wherein the step of selecting each IP address from the plurality of IP addresses of the proxy server include an ordered selection of the plurality of IP addresses based on incoming request arrival.

26. The non-transitory machine-readable storage medium of claim 23, further comprising instructions, that when executed by the processor, cause the processor to perform the following:
receiving, from a first one of the plurality of clients, a set of one or more second incoming requests, wherein each second incoming request is for an action to be performed on an identified resource of the same domain as the first incoming requests;
for each of the set of second incoming requests, creating a second outgoing request to transmit to the destination origin server that hosts the resource identified in that second incoming request; and
transmitting each second outgoing request from a same IP address of the proxy server as used in the first outgoing request transmitted for the first one of the plurality of clients.

* * * * *